United States Patent
Ostendarp et al.

[11] Patent Number: 5,984,159
[45] Date of Patent: Nov. 16, 1999

[54] METHOD AND APPARATUS FOR CUTTING THROUGH A FLAT WORKPIECE MADE OF BRITTLE MATERIAL, ESPECIALLY GLASS

[75] Inventors: Heinrich Ostendarp; Christoph Hermanns, both of Mainz; Dirk Hauer, Ingelheim; Juergen Stein, Mainz; Georg Geissler, Huenstetten; Ralf Steinfartz, Mainz; Bernd Hoetzel, Woerrstadt; Andrew Blunck, Gruenenplan, all of Germany

[73] Assignee: Schott Glas, Mainz, Germany

[21] Appl. No.: 09/060,185

[22] Filed: Apr. 14, 1998

[30] Foreign Application Priority Data

Apr. 14, 1997 [DE] Germany .............................. 197 15 537
Aug. 12, 1997 [DE] Germany .............................. 197 34 823

[51] Int. Cl.$^6$ .................................................. B23K 15/00
[52] U.S. Cl. ........................ 225/93.5; 225/1; 219/121.72; 219/121.73; 65/105; 65/112
[58] Field of Search ................................... 225/93.5, 1, 2, 225/3, 4, 5; 219/121.61, 121.72, 121.73; 65/112, 113, 105

[56] References Cited

U.S. PATENT DOCUMENTS

| | | |
|---|---|---|
| 3,453,097 | 7/1969 | Hafner . |
| 4,615,765 | 10/1986 | Levinson et al. ........................ 156/643 |
| 5,084,604 | 1/1992 | Dekker et al. ....................... 219/121.72 |
| 5,120,926 | 6/1992 | Marriott ............................. 219/121.67 |
| 5,132,505 | 7/1992 | Zonneveld et al. ................... 219/121.6 |
| 5,138,131 | 8/1992 | Nishikawa et al. ................. 219/121.67 |
| 5,237,150 | 8/1993 | Karube ............................... 219/121.72 |
| 5,585,018 | 12/1996 | Kanaoka et al. .................... 219/121.72 |
| 5,609,284 | 3/1997 | Kondratenko ................................ 225/1 |
| 5,622,540 | 4/1997 | Stevens ....................................... 65/112 |
| 5,776,220 | 7/1998 | Allaire et al. .............................. 65/112 |
| 5,825,801 | 10/1998 | Nishida et al. ............................ 372/99 |
| 5,826,772 | 10/1998 | Ariglio et al. ............................... 225/2 |

FOREIGN PATENT DOCUMENTS

| | | |
|---|---|---|
| 0 062 484 | 10/1982 | European Pat. Off. . |
| 1 244 346 | 8/1967 | Germany . |
| 43 05 107 A1 | 8/1994 | Germany . |
| 44 11 037 C2 | 7/1995 | Germany . |
| 1 433 563 | 4/1976 | United Kingdom . |
| WO 93/20015 | 10/1993 | WIPO . |
| WO 96/20062 | 8/1996 | WIPO . |

*Primary Examiner*—M. Rachuba
*Assistant Examiner*—Stephen Choi
*Attorney, Agent, or Firm*—Michael J. Striker

[57] ABSTRACT

The method and apparatus for cutting through flat workpieces made of glass can cut through workpieces with greater thickness, e.g. glass panes with a thickness greater than 0.2 mm, than possible up to now with a comparable known method, without micro-fractures, glass fragments or splitter. In the method of the invention a heat radiation spot symmetric to the cutting line is produced on the workpiece. This heat radiation spot has edge portions with elevated radiation intensity and is moved along the cutting line and/or the workpiece and the heated section of the cutting line is subsequently cooled. A scanner motion produces the heat radiation spot so that edge portions of elevated radiation intensity coincide with a V- or U-shaped curve, which is open at the leading end of the heat radiation spot. The peak portion of the V- or U-shaped curve on the cutting line is at a temperature maximum that is under the melting point of the workpiece material. A controller of the scanning motion controls the scanner in circular cutting and freeform cutting so that a curved V- or U-shaped intensity distribution which fits the curved cutting path arises.

12 Claims, 6 Drawing Sheets

METHOD AND APPARATUS FOR CUTTING THROUGH A FLAT WORKPIECE MADE OF BRITTLE MATERIAL, ESPECIALLY GLASS

BACKGROUND OF THE INVENTION

The present invention relates to a method for cutting through a brittle material, especially glass, along a predetermined separating line, in which the separating line is heated with a heat radiation spot symmetrical to it, which has edge portions with an elevated heat radiation intensity and a temperature maximum at its rear end; the heated region is moved along the cutting line and/or the workpiece and a section of the heated cutting line is subsequently cooled. The invention also relates to an apparatus for performing this method.

Conventional methods for cutting flat glass are based on first making an extended scratch in the glass by means of a diamond or a cutting wheel in order to break the glass subsequently along the weakened region of the scratch by an external mechanically applied force. In this method disadvantageously particles (splitter) that can be deposited on the glass and can lead to further scratching there are released from the surface by the scratch. Similarly curved glass fragments are produced at the cut edge, which leads to an uneven glass edge and thus requires considerable afterworking expense. Furthermore the micro-fractures arising during the scratching lead to a reduced capability to take mechanical stresses at the cut edge, i.e. to an increased danger of breakage.

Some progress toward avoiding both splitter and also glass fragment generation and micro-fractures has been made by cutting glass using thermally generated stresses and strains. In this method a heat source, which is directed to the glass is moved with a fixed speed over the glass and thus produces comparatively large thermal stresses and strains so that cracks are formed in the glass. Infrared radiation sources, special gas burners and especially lasers have the required heat source properties to be able to position thermal energy locally, i.e. with a precision of better than a millimeter, which corresponds to a typical required cutting precision. Because of the ability to focus the laser beam on the glass, the applied power and distribution of the laser radiation in and through the glass can be controlled satisfactorily.

A method for scratching glass is disclosed in DE-AS 1 244 346 in which the glass is heated along a cutting path by laser radiation, while the temperature is kept under the melting temperature of the glass. After the heating the glass is cooled and cut by bending or impact. Also it can be heated over the melting temperature so that fine cracks or fractures are melted out.

GB-PS 1,433,563 describes a method in which the glass is worked with two laser beams. One of the beams has a comparatively lower energy and is used for pre-heating.

A process is described in DE 4 411 037 C2 in which a moving stress zone with a temperature of 250° C. is produced in a hollow glass by means of a laser beam. A short starting scratch is produced mechanically by a short duration contact of a scratching point or tip with the surface of the hollow glass after the introduction of the stress zone, which is put substantially on the track or path exposed to the maximum laser beam intensity and thus which is at the highest temperature. The stress zone is cooled by means of a liquid absorbing fabric or web, whereby thermal shock and thus the stresses are increased so that the starting scratch forms a cut or fissure.

U.S. Pat. 5,237,150 describes a cutting process for thick steel plates, which uses a laser beam in a ring mode in order to protect the focusing lens. The laser beam is ring-like when it impinges on the lens, so that the energy of the laser beam is distributed over a comparatively larger surface of the lens than when a point-like laser beam impinges on the lens. Because of that the local heating of the lens material is avoided. The beam itself is however focused to a point or spot on the workpiece by means of the focusing lens. No increased intensity at the edge regions as in the case of a ring-like spot is present in the resulting spot, since the ring-like beam is brought to a "point", which cuts the steel along the cutting line as a "cutting point".

A laser beam in ring mode $TEM_o$ is similarly used, which is focused like a point on the workpiece in the method described in EP 0 062 484. When the laser beam is however focused like a point, the intensity maxima are merged at the point. Because of the laser beam is focused on the surface of the workpiece, the glass evaporates up to a certain depth. The remainder of the glass is heated above the melting point. The vaporized glass material is removed by means of a gas.

DE-OS 43 05 107 relates to a method and apparatus for cutting glass with a laser beam, whereby the laser beam is divided into two parallel beams which act on the glass symmetrically to the cutting line. No exact step (+0.1 mm) can be produced with this type of arrangement, but the cut weaves between both beam tracks.

The method described in WO 93/20015 uses a laser beam with an elliptical shape. This method produces good results with straight scratches or cracks in non-metallic plate material but no precise and accurate cut can be produced reliably along a curved path. Furthermore the stability of the cutting path in this process is poor at high radiation density and high cutting speed. This occurs because the heating with a laser beam has an elliptical cross section so that the Gaussian distribution of radiation density occurs in a very narrow range, whereby the temperature increases dramatically from the periphery to the center. It is extremely complicated to obtain a stable thermal fissure at high speed, with a deep scratch and yet with a stable power density, when the heating of the workpiece frequently results in overheating the central region of the irradiated portion of the workpiece, i.e. the softening temperature of the material is exceeded, although this is not permitted in precession cutting.

WO 96/20062 describes the closest state of the art method to that of the invention. This reference describes a method of cutting flat workpieces of brittle material, especially glass, along a predetermined cutting line with a heat radiation spot arranged symmetrically on the cutting line, which has an increased radiation intensity in its edge zones with a temperature maximum at its rear end, whereby the heated zone is moved along the separating line and/or the workpiece and in which the heated separated line section is subsequently cooled. These features are set forth in the preliminary portion of the main method claim appended hereinbelow.

In the known case an oval or elliptical heated region is provided with a radiation intensity minimum inside of the oval. This "cutting spot" intersections the separating line twice, namely at the front and at the rear end of the oval. Because of that however an unsatisfactory temperature distribution results, which is shown in FIG. 1 of the WO-paper. An unnecessary heating occurs already in the forward region of the elliptical cutting region that is forward in the cutting direction in the vicinity of the cutting line because of the forward cutting point.

An unnecessarily large heating arises in the center of the cutting region, i.e. on the cutting line, because of that so that at the end of the burning zone, where the laser beam intensity is very large in the vicinity of the cutting line and the temperature has reached a maximum, the glass can already be melted under the circumstances.

Furthermore in this method only glass with a thickness up to 0.2 millimeters can be cut, because with the higher required beam power a melting occurs and the cutting is interrupted. With glasses of grater thickness only cracking of the glasses occurs.

SUMMARY OF THE INVENTION

It is an object of the present invention to provide a method and apparatus with which a flat workpiece, especially with a comparatively large thickness, e.g. a glass plate with a thickness greater than 0.2 millimeters, can be cut through, without forming micro-cracks, glass fragments or splitter. Furthermore with thick glasses a cutting depth is obtained which is greater than the cutting depth obtainable with other processes.

According to the invention, the method for cutting through a flat workpiece made of brittle material, especially glass, along a predetermined cutting line, comprises the steps of:

a) heating the cutting line together with a heat radiation spot symmetrical to the cutting line so that edge portions of the heat radiation spot have a comparatively large radiation intensity relative to that in an interior thereof and a temperature maximum at a rear end thereof; and b) moving the heated radiation spot along the cutting line on the workpiece; and c) cooling a section of the cutting line heated by the heating of step a), wherein the edge portions of the heat radiation spot coincide with a V- or a U-shaped curve open at a front or leading end of the heat radiation spot in a motion direction of the heat radiation spot on the workpiece and the temperature maximum is located locally on a peak portion of the V- or the U-shaped curve on the cutting line and is below a melting temperature of the workpiece.

Because of the features of the method of the invention set forth above energy is applied to the cutting line at the end of the heat treatment and the workpiece reaches a high temperature. Because of that a high mechanical stress with a local temperature maximum is produced at the cutting line. On subsequent cooling of the cutting line and previous weakening of the glass at the beginning of the cutting line the glass fractures along the cutting line. The cut is made very precisely along the cutting line because of the strong local temperature maximum on the cutting line, which for example is necessary in high precision cutting in the display industry.

An additional advantage of the method of the invention is that a mechanical breaking after the heating and cooling treatment is not necessary so that a clean-cut edge results.

In the radiantly heated region with the V- or U-shape according to a preferred embodiment of the invention the edge portions of the radiantly heated region with increased radiation intensity lie on a V- or U-shaped curve which opens in the cutting direction. Both sides or legs of the V-and/or U-shaped curve are equally spaced from and adjacent to the cutting line, so that with one kind of shape for the heated region the workpiece surface is heated by the intensity maximum spaced a comparatively large distance from each other, which amounts to a few millimeters, whereby a local temperature minimum exists between both intensity maxima. The local temperature minimum is increasingly reduced by the approach of the legs of the V- or U-shaped curve to each other at the rear end of the radiantly heated region, i.e. the temperature in the vicinity of the cutting line increases at the end of the radiantly heated region so that a local temperature maximum is reached there on the workpiece surfaces, which however is still below the melting temperature of the workpiece material. This kind of radiantly heated region causes a uniform heating of the workpiece at a temperature below the melting temperature over a greater width and depth in the region where the intensity maxima are spaced apart, which is not the case with radiation which has its maximum intensity in the center, especially at the beginning of the radiantly heated region. An immediate cooling by means of a liquid, a gas, or an under-cooled mechanical contacting head that has the greatest intensity on the cutting line, follows the heated track thus produced. This cooling causes a contraction of the material. Because of the heating to a greater width with a temperature maximum on the cutting line in combination with the cooling which similarly has a great effect on the cutting line, a comparatively high mechanical stress with a strong local maximum is produced at the cutting line. Because of that it is possible to cut cleanly through a workpiece having a large thickness. Experiments have shown that a glass pane having a thickness of up to 1.1 mm can be cut through in a stable manner.

The width of the V- and U-shaped radiantly heated region is advantageously from 0.5 to 2 mm. The length of the radiantly heated region can be from 10 to 30 mm. These dimensions are set to provide a uniform heating of the workpiece to the required depth considering, among other things, feed speed, workpiece thickness, radiation intensity and material properties.

According to a special embodiment of the invention scanning a laser beam over the workpiece produces the heat radiation spot.

Advantageously the scanning is performed over an elliptical path. In other embodiment a V- or U-shaped radiantly heated region can be produced with the laser by turning the laser on and off or by masking the beam or not, providing an appropriate diaphragm or mask in front of the beam.

The apparatus for cutting through a flat workpiece made of brittle material, especially glass, along a predetermined cutting line, comprises optical means for making a heat radiation spot on the flat workpiece, this heat radiation spot being symmetrical to the predetermined cutting line, so that edge portions of the heat radiation spot have comparatively large radiation intensity relative to an interior thereof and the heat radiation spot has a temperature maximum at a rear end thereof, wherein said optical means includes a heat radiation source and at least one optical component;

means for moving the heat radiation spot along the cutting line on the workpiece; and means for cooling a section of the cutting line heated by the heat radiation spot;

wherein the optical means and/or the heat radiation source is formed to produce the heat radiation spot so that the edge portions of the heat radiation spot coincide with a V- or a U-shaped curve open at a front end of the heat radiation spot or a leading end of the heat radiation spot in a motion direction of the heat radiation spot on the workpiece and the temperature maximum is located locally on a peak portion of the V- or the U-shaped curve on the cutting line and is below a melting temperature of the workpiece.

According to a first embodiment a scanning device can be used. Consequently the optical means has two synchronized pivotable mirrors oscillating perpendicularly to each other which guide a laser beam to the workpiece surface where it describes a V- or U-shaped curved path.

In order to drive both mirrors synchronously, a drive device for both oscillating mirrors is connected to a common controlling and regulating device. Preferably the oscillation frequency of both mirrors is at 500 to 2000 Hz so that a cutting speed of 50 mm/sec to 1000 mm/sec can be achieved which depends on the radiation intensity being used.

According to another embodiment of the scanning device the optical means has a mirror wheel whose reflecting surface is curved so that a reflected laser beam describes or follows at least one U- or V-shaped curved path on the surface of the workpiece being cut through during one revolution of the mirror wheel.

The rotation frequency of the mirror wheel is from 500 to 3000 Hz in a preferred embodiment so that the so-called feed speed can be achieved.

Preferably a laser is used having a wavelength which is largely absorbed in the material. For example, a $CO_2$ laser is used for cutting glass, which produces a laser beam having a wavelength of 10.6 nm and is obtainable commercially. The maximum output power of the laser is typically 150 watt.

The intensity of the laser is preferably changeable during each passage around the V- or U-shaped curved path so that the radiation intensity can be varied in the vicinity of the peak portion of the V- or U-shaped curved path. The radiation intensity is preferably adjusted so that the melting temperature of the workpiece is not exceeded.

A controller for the scanner motion, which controls the scanner during circular cutting and freeform cutting so that the V- or U-shaped intensity distribution is adjusted to fit the curved path, is similarly possible, as is exemplified later in greater detail.

Instead of this scanner device the desired shape of the radiantly heated region can also be provided using beam-shaping or beam-forming optics.

In another possible embodiment a laser with a TEM 01* mode is used as the heat radiation source in which the optical device comprises a suitable diaphragm which masks or blocks a portion of the beam so that the edge portions having the increased radiation intensity coincide with the V- or U-shaped curved path on the workpiece surface. A TEM 01* mode is provided by a special resonating device of the $CO_2$ laser.

An under-cooled metallic contacting head can be used for the means for cooling. Furthermore it is possible to use a gas jet device, a liquid injection device or a liquid spraying device as the cooling means.

BRIEF DESCRIPTION OF THE DRAWINGS

The objects, features and advantages of the invention will now be illustrated in more detail with the aid of the following description of the preferred embodiments, with reference to the accompanying figures in which:

FIG. 1 is a top plan view of a portion of a workpiece to be cut through;

FIGS. 7a and 7b are perspective graphical illustrations of intensity profiles produced by the apparatus illustrated in FIG. 7a;

DESCRIPTION OF THE PREFERRED EMBODIMENT

Figure 1:
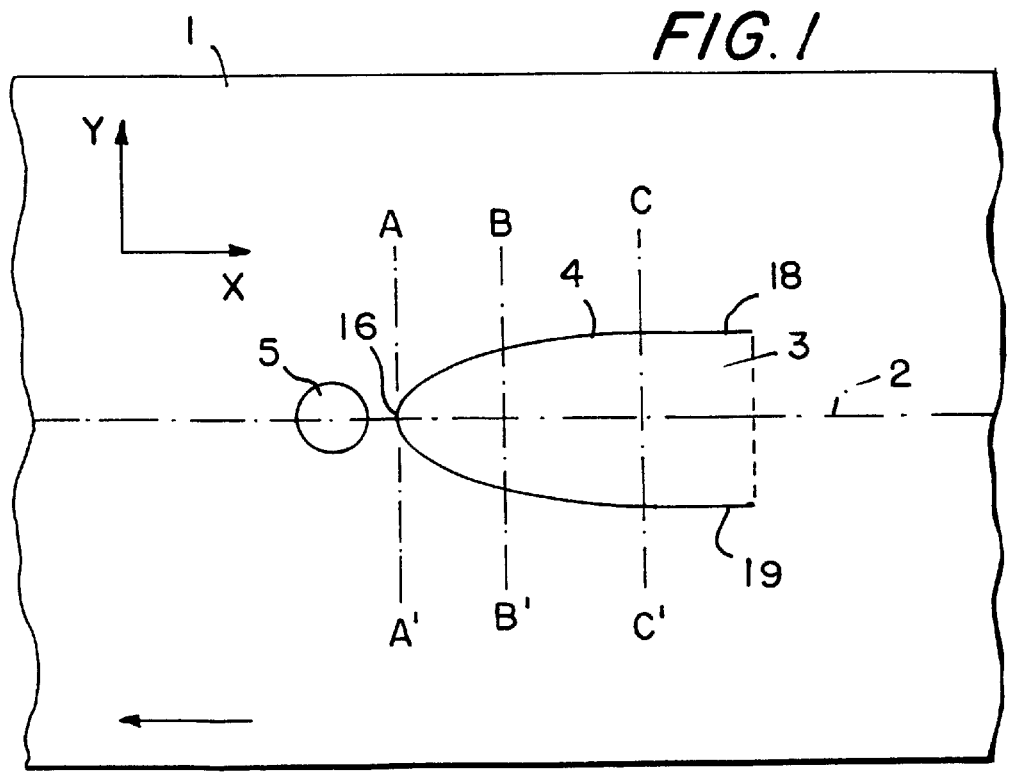

FIG. 1 shows a glass pane 1 that should be cut along the cutting line 2. A U-shaped heat radiation spot 3 is arranged on the surface of the glass pane 1 that is moved in the direction of the arrow in FIG. 1 (feed direction).

Figure 2:
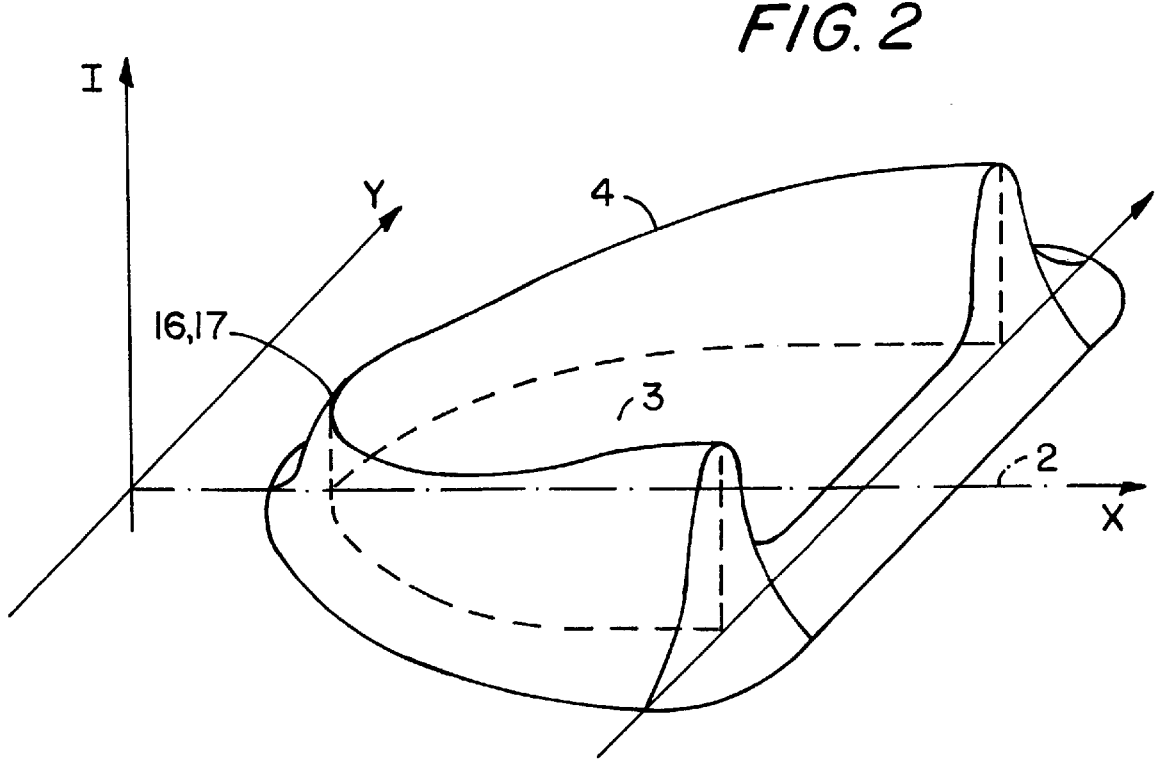
FIG. 2 is a perspective view of a three-dimensional representation of the intensity distribution of a radiantly heated region of the workpiece.

The edge portions of this spot having increased radiation intensity follow the U-shaped curve 4 in FIG. 2 which opens at the front of the spot or the leading end of the spot in the feed direction. The form of the heat radiation spot corresponds to about a half ellipse whose widest section forms the front end of the heat radiation spot 3.

Both edge portions 18,19 on the U-shaped curve 4 are spaced from each other symmetrically to the cutting line 2. The spacing of the edge portions 18,19 amounts to about 1 mm in the front region of the heat radiation spot 3. The spacing of both edge portions 18, 19 decreases to the peak portion 16 which is on the separating or cutting line 2.

In FIG. 2 the three-dimensional radiation intensity distribution of the heat radiation spot 3 is shown. FIG. 2 shows that the crest of the intensity maxima falls off in the peak portion 16, where local maximum 17 relative to the cutting line 2 is located. The intensity is clearly reduced in the interior of the heat radiation spot between the edge portions 18, 19. The height of the local maximum 17 must be adjusted to correspond to the workpiece thickness and the cutting speed. The local maximum 17 must be higher at higher cutting or feed speed than at lower feed speed. Also the local maximum 17 must be adjusted to the height of the radiation intensity in the forward region of the curve 4.

The local maximum relative to the cutting line must not at the same time form the minimum of the curve 4. The intensity can have a gentle maximum or hump in the peak region 16 when a laser without power controller is used.

Figure 3:
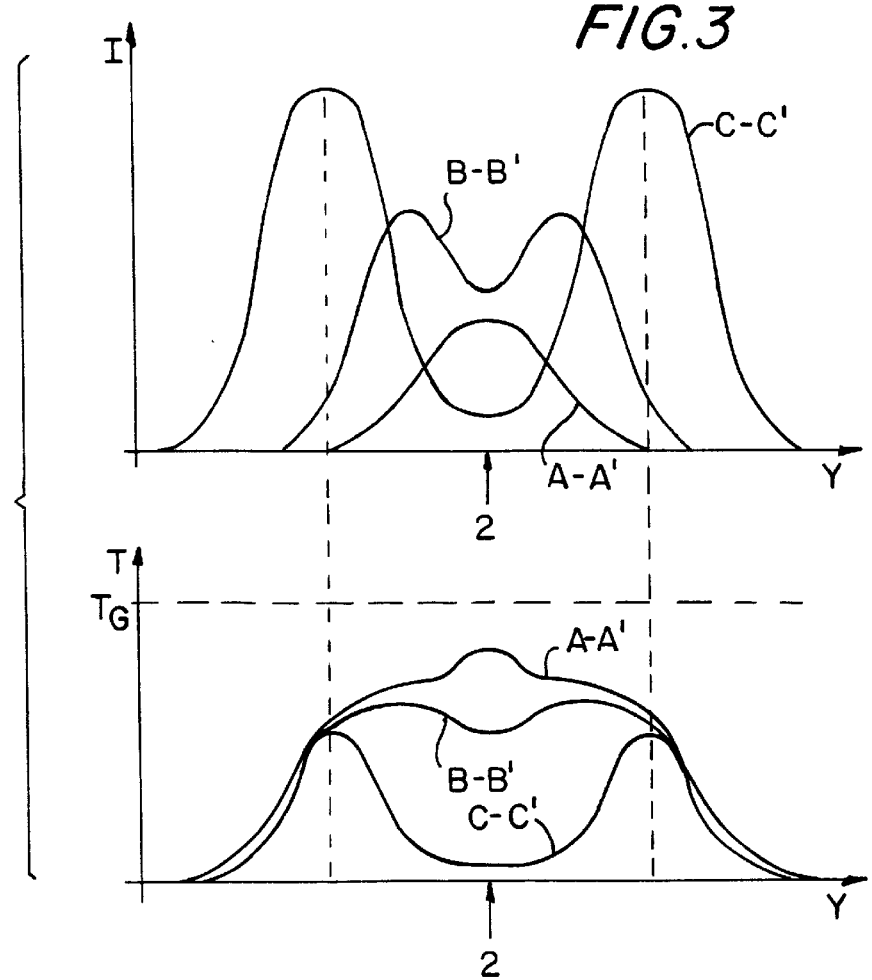
FIG. 3 is a graphical illustration of the respective intensity and/or temperature profiles through the radiantly heated region shown in FIG. 1 and taken along the sections designated A–A', B–B' and C–C' in FIG. 1.

Three radiation intensity profiles along three different cross-sections A–A', B–B' and C–C' through the radiantly heated region (See FIG. 1) are shown in FIG. 3. The radiation intensity curve for the cross-section C–C' has two maxima spaced from each other, which are clearly higher than both maxima for the cross-section B–B'. The intensity maximum is still more clearly reduced in the peak portion 16 that is shown for the cross-section A–A'. The temperature profile in the section B–B' only has a small local minimum in the vicinity of the cutting line because a pre-heating has occurred in a wide section or zone around the cutting line by means of both maxima. This minimum is balanced by a relatively reduced intensity so that the temperature profile has a maximum in the region of the cutting line 2 in the peak portion 16.

Figure 4:
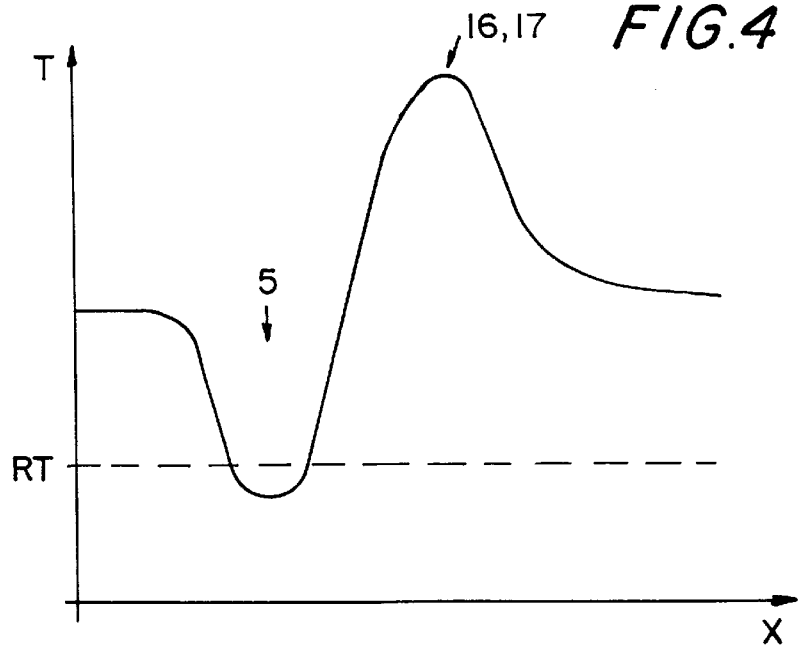
FIG. 4 is a graphical illustration of the behavior of temperature along the cutting line.

The behavior of the temperature along the cutting line with an imbedded cooling spot 5 is shown in FIG. 4.

Figure 5:
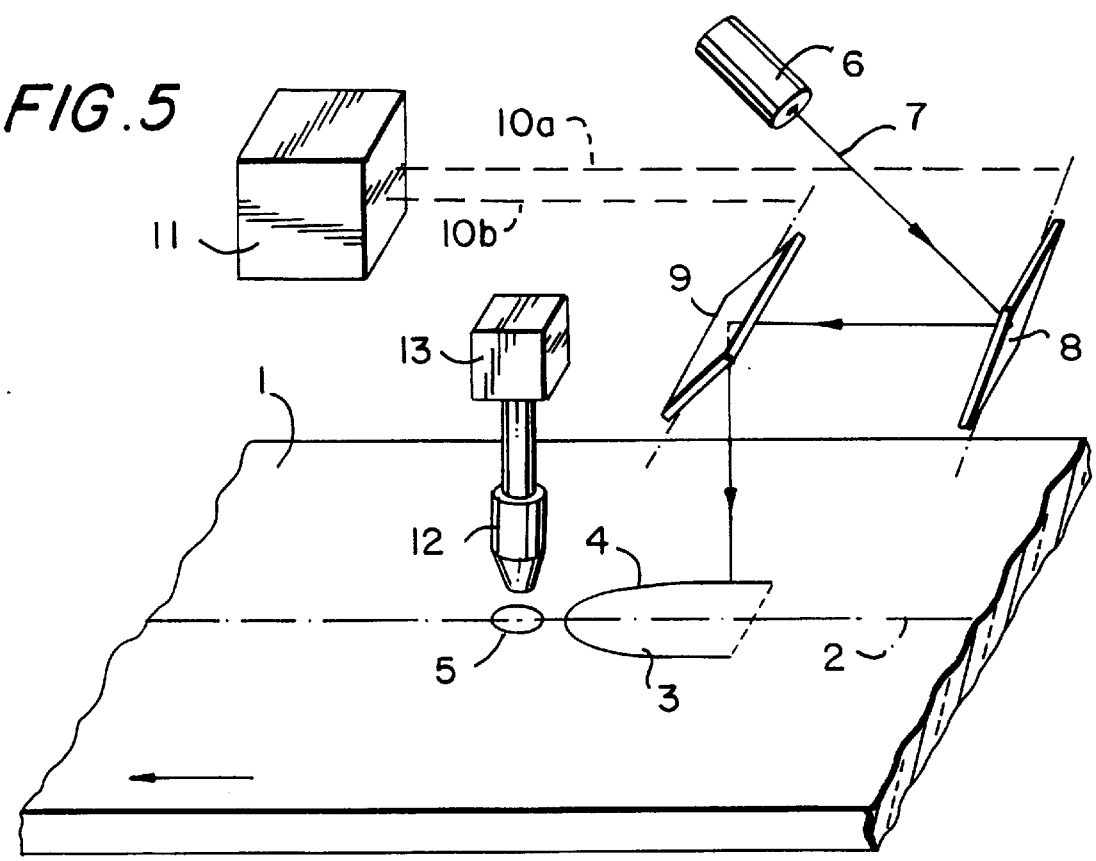
FIG. 5 is a perspective view of an optical and cooling device in an embodiment of the apparatus according to the invention.

The apparatus for making the heat radiation spot 3 in a glass plate or pane 1 is shown in FIG. 5. The cutting line 2 and the U-shaped curve of increased intensity 4 are shown on the surface of the glass pane 1. A laser 6 producing a laser beam 7, especially a $CO_2$ laser, is provided as heat radiation source. This laser beam 7 first impinges on a pivotable mirror 8 oscillating about a vertical scanner axis 8a, which moves the beam 7 back and forth in a plane parallel to the surface of the glass pane 1. This oscillating laser beam 7 then strikes a second pivotable mirror 9 oscillating about a horizontal scanner axis 9a, which moves the reflected laser beam back and forth in the X-direction. The arrangement of the mirrors 8 and 9 can also be exchanged. The laser beam describes a U-shaped curve on the workpiece surface because of the overlapping of both oscillatory motions. A common controlling and regulating device 11 is provided for adjustment of the oscillations of both mirrors so that the U-shaped curve 4 is obtained. The controlling and regulating device 11 is connected to the unshown drive of both mirrors 8 and 9 by the control lines 10a, 10b.

The mirrors 8 and 9 can be controlled so that the laser beam 7 describes a closed curve on the surface of the workpiece. The laser 6 is turned on and off in order to obtain either a U-shaped or V-shaped curve.

A cooled spot 5 is shown behind the radiantly heated region 3 that is produced by the cooling gas issuing from a spray nozzle 12. This spray nozzle 12 is connected to a supply unit 13.

Figure 6:
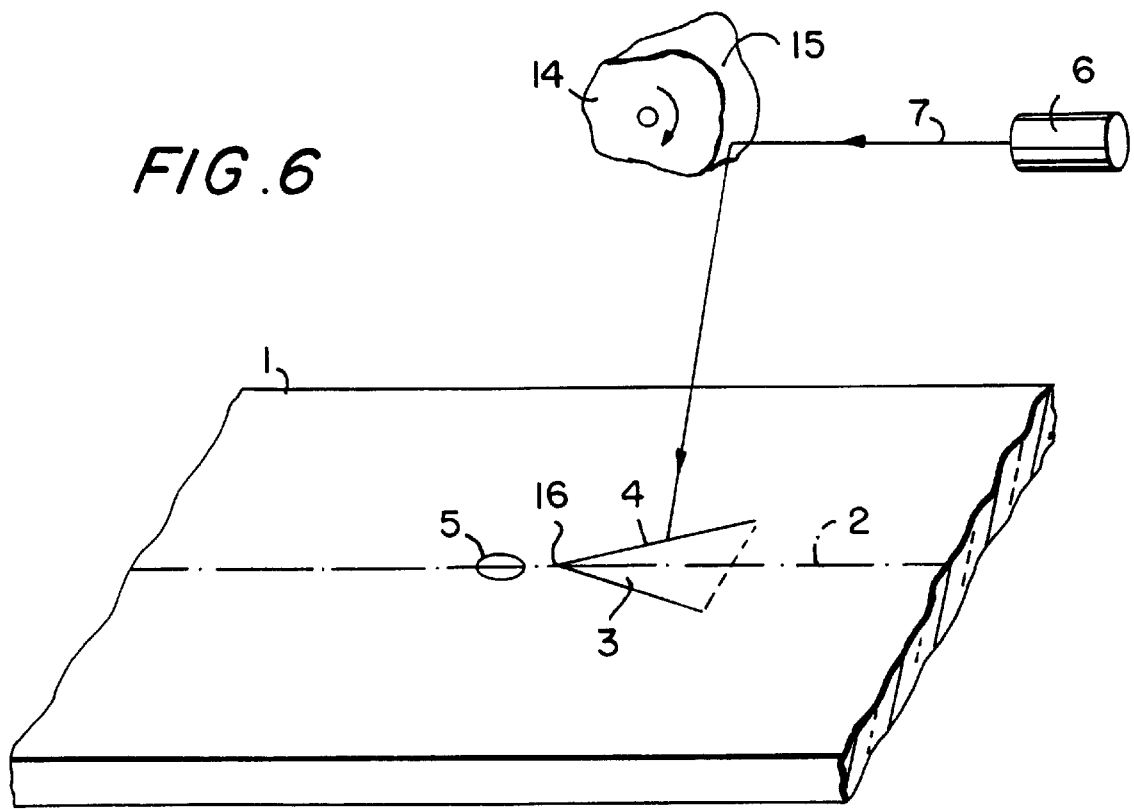
FIG. 6 is a perspective view of an additional embodiment of the apparatus according to the invention.

A workpiece 1 is shown in FIG. 6 on whose surface a heat radiation spot with a triangular shape is arranged. The portions of that region of higher intensity are indicated by the V-shaped curve 4. Also this V-shaped curve 4 is symmetric to the cutting line 2 so that the peak portion 16 is on the cutting line 2. A laser 6 is provided to produce this sort of V-shaped curve, which produces a laser beam that strikes a mirror wheel 14. The reflective surface of the mirror wheel 14 is not cylindrical, but is curved, so that during a rotation of the mirror wheel 14 on the work surface the V-shaped curve 4 is produced at least once.

Figure 7A:
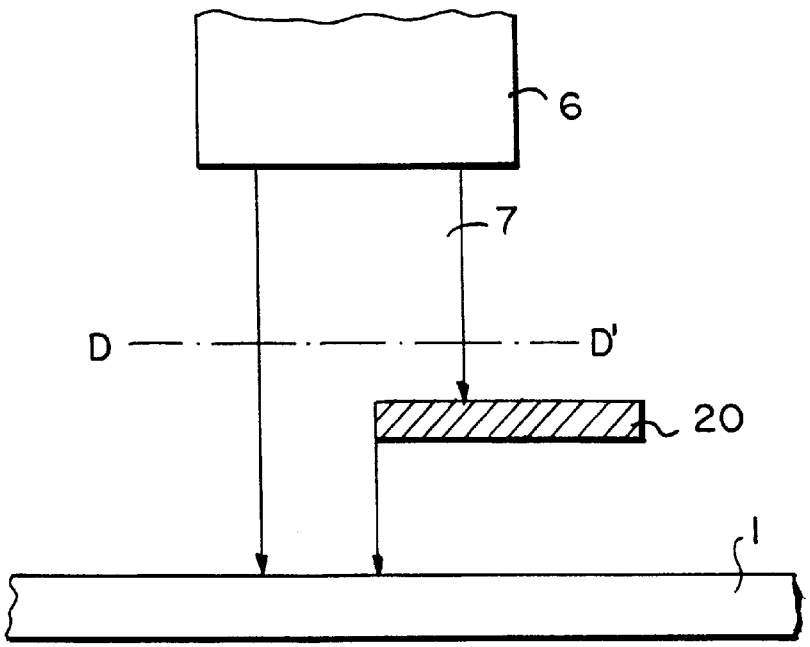
FIG. 7a is a diagrammatic view of another embodiment of the apparatus according to the invention.
Figure 7B:
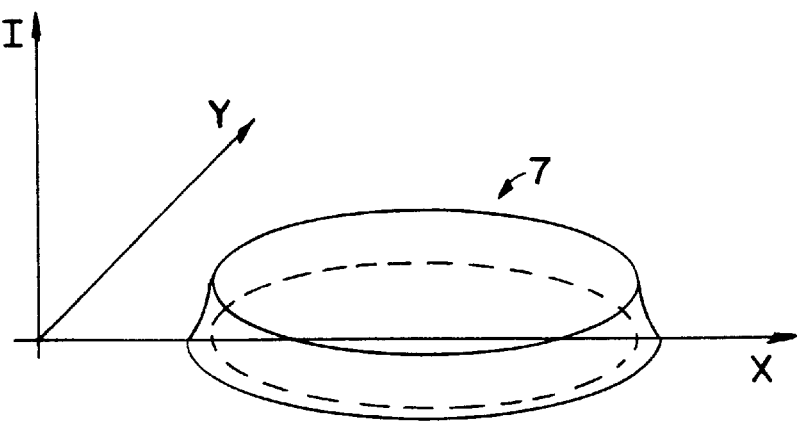
Figure 7C:
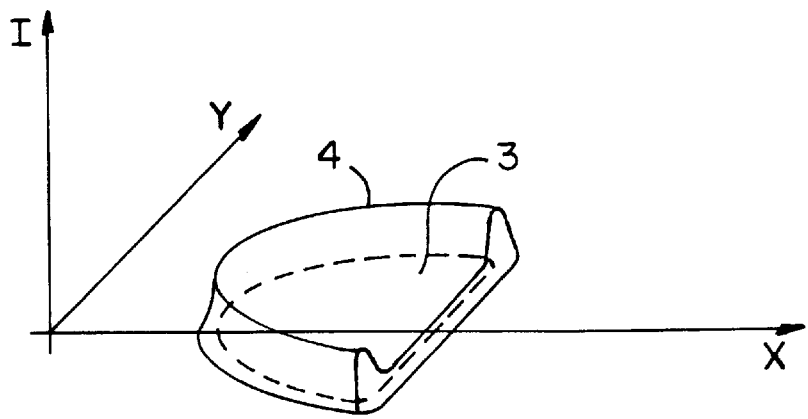

An arrangement is sketched in FIG. 7a in which a laser 6 is used which produces a laser beam 7 in the TEM 01* mode. A diaphragm 20 is arranged between the laser beam 6 and the work piece 1, which masks or blocks half the laser beam 7. The corresponding intensity profiles in front of and behind the diaphragm are shown in FIGS. 7b and 7c.

Because of the large desirable mechanical stress this process has proven suitable for cutting glass completely through up to a thickness of 1.1 mm, which has not been possible according to the state of the art up to now. The power of the $CO_2$ laser used is typically between 12 and 80 watts for typical feed speeds. The radiantly heated region has a length of typically 12 mm in the feed direction with a 1 mm width. The cutting edges have no micro-fractures, glass fragments and splitter. An approximately perpendicular depth crack or fracture up to a depth of several hundred micrometers occurs with thicker glasses above 0.7 mm which could not be obtained similarly with the above-mentioned other methods.

Figure 8A:
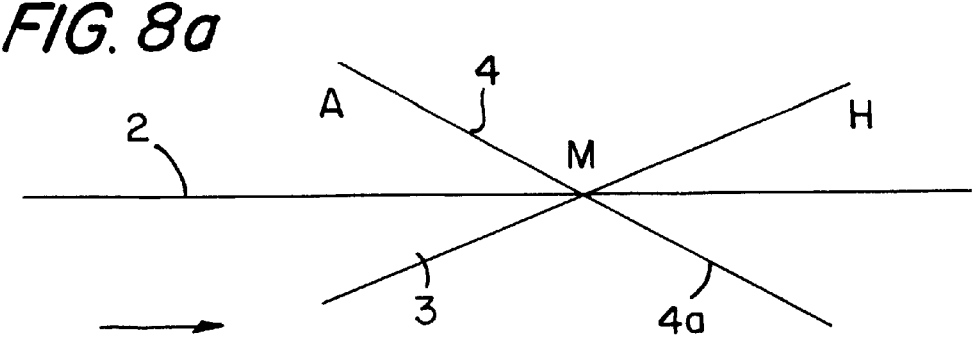
FIGS. 8a and 8b are diagrammatic plan views of a V-shaped radiantly heated region with extended sections extending from a peak.
Figure 8B:
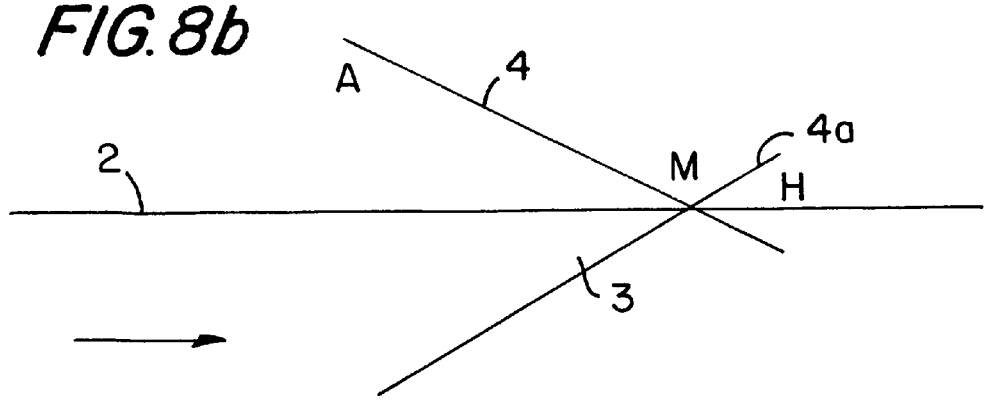

The stated V- and/or U-shape should not be taken too literally. The shape could also be similar but not exactly V- or U-shaped, e.g. parabolic. Also with a V-shaped region 3 according to FIG. 6 the extended sections or legs do not necessarily end at the peak portion. They can, as shown in FIG. 8, also have extended sections 4 that go beyond the peak portion. The V-leg 4 and its extension 4a are equal length in FIG. 8A and thus form a quasi cross-shaped portion, but the extension 4a in FIG. 8B is shorter than its V-leg or V-section 4.

Which of the variants A or B are used depends on the specific material properties of the glass being cut.

These properties are typically the thermodynamic variables (heat capacity), glass thickness and optical properties (absorption of the laser radiation). The following qualitative principles briefly summarize the situation:

large heat capacity: short extension or section length, heat quickly penetrates into the glass.

large thickness: long extension or section length, heating requires time for diffusion in the glass.

Absorption: long extension or section length: heating requires time for diffusion into the glass.

In principle the region according to FIG. 8B can be laterally exchanged or flipped (shorter extensions or legs). With this radiation geometry the glass is heated too quickly, i.e. the local temperature gradient was very high which can lead to damage of the glass. Since the heat has "no time" to penetrate the glass, the glass transition temperature Tg is exceeded in a short time. The result is either uncontrolled breaking or chipping off of glass fragments.

Figure 8C:
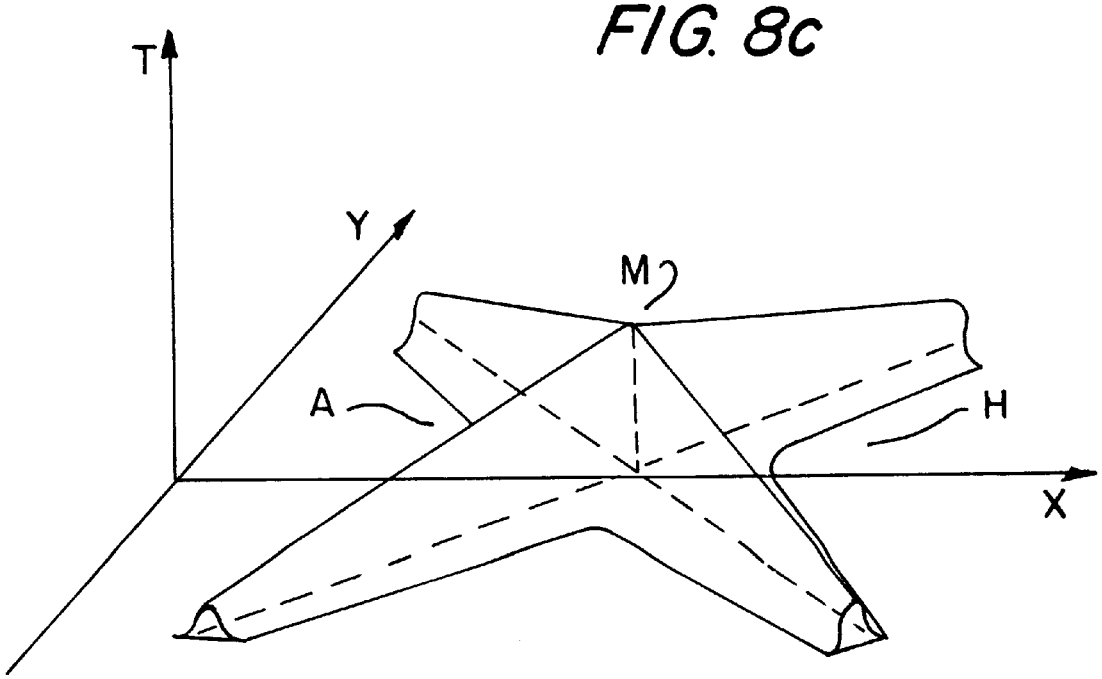
FIG. 8c is a diagrammatic perspective view of a temperature distribution of the radiantly heated region of FIGS. 8a and 8b.

The laser radiation spot or region according to FIG. 8A ※- and similarly for the region according to FIG. 8B -※ advantageously has an intensity and temperature profile according to FIG. 8C with a temperature maximum at point M.

The intensity of the laser beam has in principle a constant Gaussian form in space and time. When one moves along the glass in the direction of the crossing point of both laser beams from point A to H, the following temperature behavior results:

Point A: The glass is at the ambient temperature.

Point M: The glass is continuously heated between points A and B and the temperature reaches a maximum at M. The temperature lies under the transition temperature Tg.

Point H: The temperature is maintained or gently decreases between points M and H. In this stage the heating goes from the surface somewhat into the glass interior. The cut quality is clearly improved by the desired flattening of the temperature gradient in the cut direction or perpendicular to it.

The section or extension 4 and 4a in FIGS. 8A and 8B are, as shown, linear. They can however also in principle be gently curved.

The width of the heat radiation spot or heated region of the workpiece is typically clearly less than its length during cutting of flat glass by means of a laser beam. It is essential for an acceptable cut that the surface points of the glass surface located in the cutting zone must experience a predetermined heating and cooling behavior in the course of the process. This has the consequence that the width of the radiation beam remains unchanged with an increase of the cutting speed while the length of the radiation beam must increase. High cutting speeds that are required for a high cutting throughput, require thus a long narrow radiantly heated region along the cutting line. Typical lengths of the radiantly heated region amount to 10 mm to 50 mm with a width of 0.5 to 2 mm, with an inclination toward smaller width in high precision work.

As long as a straight cut is made, the cutting is without problem with a longitudinally extended radiantly heated region.

Also cutting must occur along a predetermined curved path in some applications. This type of cutting is also called freeform cutting or curve cutting.

This type of curve cutting is required for cutting motor vehicle front and rear windows and for making larger holes in flat glass panes.

The performance of this type of curve cutting requires special considerations.

The heat radiation beam must be adjusted to the path of the curved cut in curve cutting, so that a maximum mechanical stress arises in the glass to be cut and the width of the heated region remains small. With a linear heat radiation beam then only a small curvature radius for the cut is possible in curve cutting with a longitudinally extended heat radiation beam. For larger curvature radii the curvature can only be obtained with a reduced length linear heat radiation beam. Finally only reduced cutting speeds are possible.

An apparatus for forming a longitudinally extended radiantly heated region for cutting glass is described in the already mentioned WO 93/20015 and/or WO 96/20062. In this apparatus the heat radiation beam is curved according to the local shape of the cutting curve, so that a minimum variation from the cutting curve arises. Since this apparatus however operates with static optical elements, which allow only limited variation of the heat radiation beam, the known apparatus can only be used in practice for cutting of circles, because they can be cut with a constant curvature radius.

If blanks of PKW glasses for mirrors or panes generally are guided through with a high speed, variation of the radiation profile at high speed during the cutting is not possible with this apparatus.

In the described method performed with the apparatus shown in FIG. 5 for cutting of flat workpieces from brittle material, especially glass, in which the cutting heat radiation spot is produced by scanning the heat radiation beam over the workpiece surface by means of moving optical elements, the process must be conducted and the apparatus must be formed so that a heat radiation beam adjusted or fit to the shape of the curved cut being made is producible in the curve cutting.

The controller 11 shown in FIG. 5 fits or adjusts the profile of the scanned heat radiation beam 7 to the curved shape of the cutting line 2 during the curve cutting. The heat radiation beam 7 can be rotated over a range of 360° by changing the oscillation conditions of the pivotable mirrors 8 and 9 oscillating perpendicular to each other by engagement of the controller 11 to produce a freeform cut. Also the curvature of the heat radiation beam is thus adjusted to the local curvature of the cut, as is clearly illustrated in FIG. 10. No mechanical additional devices are necessary for making the heat radiation beam according to the local cutting position and the curvature of the curved cut.

Both scanner motions must be synchronized with each other to produce the curved radiantly heated region so that a predominantly oscillatory motion of the heat radiation beam is produced along the cutting line 2. In that motion the position of the cooling spot 5 following the cutting spot must be adjusted to the local cut position. A mechanical rotation device is provided in the scanning optics for this purpose.

Figure 9:
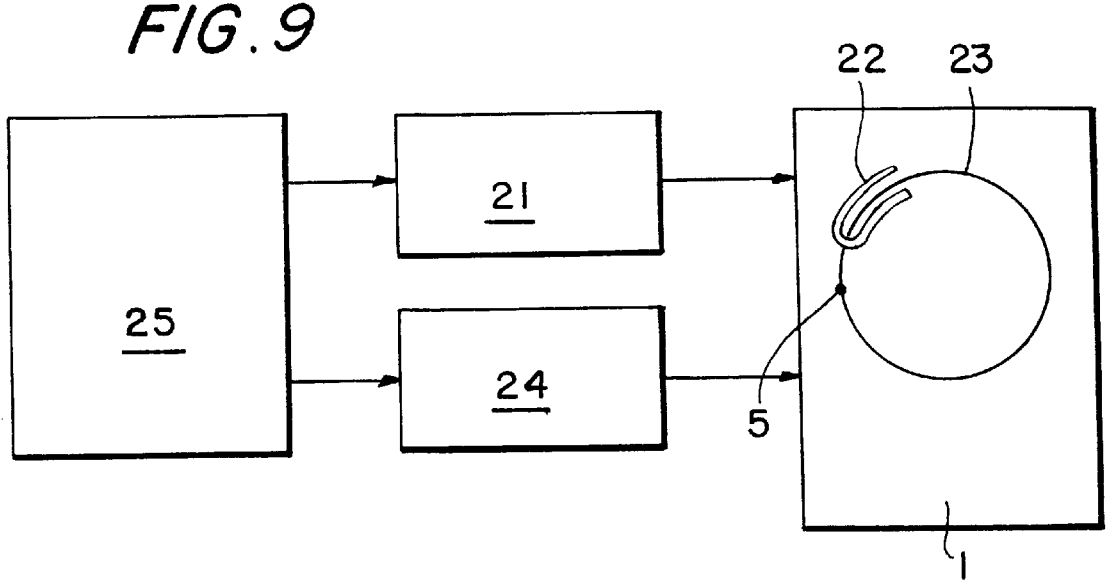
FIG. 9 is a schematic block diagram of the entire arrangement for the apparatus according to the invention including the associated controller which allows a freeform cutting with a curved heat radiation spot.

FIG. 9 is a schematic block diagram of the entire arrangement of the apparatus according to the invention, including the associated control means. The block 21 indicates the scanner block including the controller 11 of FIG. 5 for producing the curved heat radiation spot 22 on the circular cutting line 23 on the workpiece 1 with the following cooling spot 5. The stage 24 is a path controller for the cutting process of a known structure. The controller blocks 21 and 24 are coupled with each other by the main controlling unit 25 so that cutting with an optimized heat radiation beam can be performed locally according to the curvature in freeform cutting with locally changing cutting radii.

FIG. 5 is a preferred embodiment of the apparatus according to the invention. Generally scanner devices are provided which allow a suitable two-dimensional variation in the motion of the heat radiation beam, i.e. the heat radiation beam must be guided in two dimensions on the workpiece and changes in the produced heat radiation beam are allowed by control engineering means.

Figure 11:
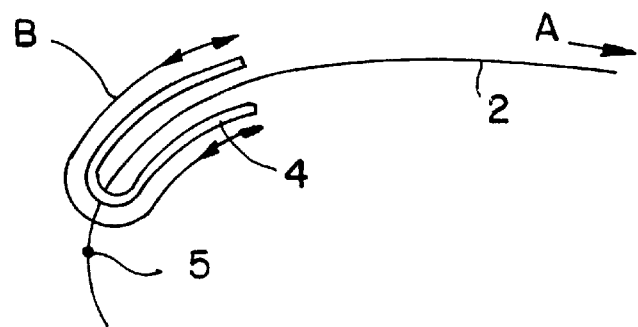
FIG. 11 is a two-dimensional diagrammatic view similar to FIG. 10, however with a radially heated region produced by a reverse scanner motion.

Another unshown two-dimensional scanning device can also be used alternatively to the two-dimensional scanning device according to FIG. 6 with two oscillating pivot-mounted mirrors 8, 9. In this other scanning device one of the scanner axes 8$a$,9$a$ is used for oscillation along the cutting direction 2,23 independently of the cutting direction 2, 23 and the perpendicular pivoting mirror adjusts the V- or U- or elliptical radiation profile according to the local curvature of the cutting path. Here the entire scanner unit is mechanically freely rotatable about 360°. Especially in an embodiment according to FIG. 11 this scanner axis has the required dynamic reserve, since the scanner frequency without more is only half as great in relation to that of the scanner axis operating in the cutting direction. To guide the cutting head having the scanner along the curved cutting path, it is necessary to mount the scanner in a rotatable bearing. The scanner can then be rotated with the cooling spot 5 in a fixed relationship with it in this holding device.

An especially great flexibility for cutting predetermined arbitrary shapes, i.e. freeform shapes, with a comparative high cutting speed, is possible during cutting of flat workpieces of brittle material, especially glass, by the above-described measures comprising the invention. The further features of the invention provide a scanner device with moving optical elements, which allows an especially great variability for the form of the radiation, which allows a flexible adjustment of the heat radiation beam with a longitudinally extended heat radiation spot on the cutting line and thus a cutting of arbitrary shapes with a high speed.

The most widely variable heat radiation beam and/or cutting region may be produced by means of the described apparatus. A curved U- or V-shaped heat radiation beam is shown for example in FIGS. 10 and 11. Thus the heat radiation beam is provided in different shapes and manners.

Figure 10:
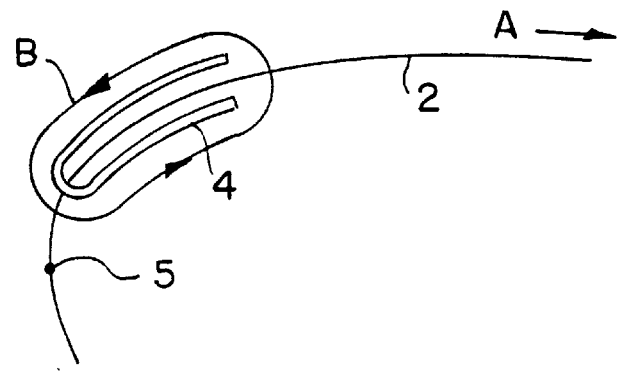
FIG. 10 is a two-dimensional illustration of a curved radiantly heated region which is produced by a revolving or rotating scanner motion while scanning a radiantly heating beam guided along a curved cutting line next to it along a U- or V-shaped path according to the curvature of the cutting line.

The radiation beam and/or the associated heat radiation spot is produced in FIG. 10 in which the heat radiation beam describes a closed curved path B on the surface of the glass. Also the heat radiation beam moves primarily along the cutting line 2, immediately next to it, in an oscillating motion. A gentle deflecting motion perpendicular to the cutting line 2 is superimposed on this oscillatory motion. The heat radiation beam producing the heat radiation spot 4, as shown, executes a closed curved path B, which engages around the cutting line 2. The power of the heat radiation source is controlled according to the position during its passing around the curved path B but is nearly zero when the front scanner position is reached in the cutting direction A. The U-shape or V-shape radiation profile is thus produced by controlling the heat radiation source. With a constant output power this source would produce an elliptical radiation beam. Alternatively, the U- or V-shaped radiation beam profile can also be produced when a diaphragm or mask is used with a radiation beam having the elliptical radiation profile. For this purpose a radiation absorbing diaphragm or the like can be positioned in the path of the radiation.

The curved U- or V-shaped heat radiation beam according to FIG. 4 other than in FIG. 10 is produced when the heat radiation beam is not oscillated in a circulating manner around a closed path, but alternately on both sides of the cutting line 2 over a predetermined length with a reverse loop at the following starting point of the curve 4. The power of the heat radiation source must be controlled for making this sort of heat radiation spot with the given intensity distribution. Generally the scanner frequency is twice as great along the cutting line as perpendicular to it in this type of scanner operation which results by motion of the U- or V-shape beam profile over the glass surface.

The disclosure of German Patent Applications 197 15 537.5-45 of Apr. 14, 1997 and 197 34 823.8-45 of Aug. 12, 1997 is hereby explicitly incorporated by reference. These German Patent Applications disclose the invention as described herein and claimed in the claims appended hereinbelow and are the basis for a claim of priority for the instant invention under 35 U.S.C. 119.

While the invention has been illustrated and described as embodied in a method and apparatus for cutting a flat workpiece made of brittle material, especially glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method for cutting through a flat workpiece made of brittle material along a predetermined cutting line, said method comprising the steps of:

a) heating the cutting line with a heat radiation spot symmetric to the cutting line, said heat radiation spot having edge portions of comparatively large radiation intensity relative to that of an interior thereof and a temperature maximum at a rear end thereof; and b) moving the heat radiation spot along the cutting line on the workpiece; and c) cooling a section of the cutting line heated by said heating of step a);

wherein the edge portions of the heat radiation spot coincide with a V- or a U-shaped curve (4) open at a front end of the heat radiation spot in a motion direction of the heat radiation spot (3) on the workpiece and said temperature maximum is located locally on a peak portion of the V- or the U-shaped curve (4) on the cutting line and is below a melting temperature of the workpiece.

2. The method as defined in claim 1, wherein the brittle material is glass.

3. The method as defined in claim 1, wherein the heat radiation spot has a width of from 0.5 to 2 mm.

4. The method as defined in claim 1, wherein the heat radiation spot has a length of 10 to 30 mm.

5. The method as defined in claim 1, wherein the edge portions of the heat radiation spot with the comparatively large radiation intensity have a parabolic shape.

6. The method as defined in claim 1, wherein the heat radiation spot has a symmetrical V-shape.

7. The method as defined in claim 1, wherein the cutting line has a curved shape, the heat radiation spot is provided by a heat radiation beam striking the workpiece and the heat radiation beam has a profile adjusted to the curved shape of the cutting line.

8. The method as defined in claim 7, wherein the heat radiation beam is guided in two dimensions along the cutting line and the heat radiation spot extends longitudinally along said cutting line.

9. The method as defined in claim 8, further comprising producing the heat radiation spot by scanning a laser beam.

10. The method as defined in claim 9, further comprising scanning the laser beam along an elliptical path.

11. The method as defined in claim 10, further comprising masking or placing a diaphragm in the path of the laser beam to produce a V- or U-shaped radiantly heated region on the workpiece.

12. The method as defined in claim 10, further comprising turning the laser beam on and off to produce a V- or U-shaped radiantly heated region on the workpiece.

* * * * *